US012662610B2

(12) United States Patent
Armstrong et al.

(10) Patent No.: US 12,662,610 B2

(45) Date of Patent: Jun. 23, 2026

(54) SULFONATE-FUNCTIONAL COATING COMPOSITIONS, METHODS OF MAKING THE SAME, AND ARTICLES THEREFROM

(71) Applicant: 3M INNOVATIVE PROPERTIES COMPANY, St. Paul, MN (US)

(72) Inventors: Paul B. Armstrong, St. Paul, MN (US); Adam J. Meuler, Woodbury, MN (US); Jon P. Nietfeld, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1144 days.

(21) Appl. No.: 17/058,272

(22) PCT Filed: Jul. 11, 2019

(86) PCT No.: PCT/US2019/041333

§ 371 (c)(1),
(2) Date: Nov. 24, 2020

(87) PCT Pub. No.: WO2020/018339

PCT Pub. Date: Jan. 23, 2020

(65) Prior Publication Data

US 2021/0198494 A1 Jul. 1, 2021

Related U.S. Application Data

(60) Provisional application No. 62/700,411, filed on Jul. 19, 2018.

(51) Int. Cl.

| | |
|---|---|
| ***C09D 183/04*** | (2006.01) |
| ***C08G 77/02*** | (2006.01) |
| ***C08K 5/544*** | (2006.01) |
| ***C09D 1/04*** | (2006.01) |

(52) U.S. Cl.

CPC ........... *C09D 183/04* (2013.01); *C08G 77/02* (2013.01); *C08K 5/544* (2013.01); *C08K 5/5477* (2021.01); *C09D 1/04* (2013.01)

(58) Field of Classification Search

CPC .......... C09D 183/04; C09D 1/04; C09D 4/00; C09D 183/02; C08G 77/02; C08K 5/544; C08K 5/5477; C08K 5/5415; C08K 5/548

See application file for complete search history.

(56) References Cited

U.S. PATENT DOCUMENTS

| | | | | |
|---|---|---|---|---|
| 5,936,703 | A | 8/1999 | Miyazaki | |
| 6,040,053 | A | 3/2000 | Scholz | |
| 6,916,773 | B2 | 7/2005 | Griese | |
| 8,772,215 | B2 | 7/2014 | Ryther | |
| 9,340,683 | B2 | 5/2016 | Jing | |
| 9,556,338 | B2 | 1/2017 | Jing | |
| 2005/0031791 | A1 * | 2/2005 | Sasaki | C09D 183/14 524/556 |
| 2010/0089290 | A1 | 4/2010 | Clark | |
| 2010/0317559 | A1 | 12/2010 | Ryther | |
| 2012/0295829 | A1 | 11/2012 | Peitersen | |
| 2013/0023458 | A1 | 1/2013 | Hodge | |
| 2016/0222223 | A1 | 8/2016 | Jing | |
| 2017/0081523 | A1 | 3/2017 | Audenaert | |

FOREIGN PATENT DOCUMENTS

| | | |
|---|---|---|
| JP | 2018-062500 | 4/2018 |
| WO | WO2007-146680 | 12/2007 |
| WO | WO2009-119690 | 10/2009 |
| WO | WO2011-084661 | 7/2011 |
| WO | WO2011-163175 | 12/2011 |
| WO | WO2013-102099 | 7/2013 |
| WO | WO2014-036448 | 3/2014 |
| WO | 2014/2098321 A1 | 12/2014 |
| WO | WO2015-143163 | 9/2015 |
| WO | WO2015-143262 | 9/2015 |
| WO | WO2016-044082 | 3/2016 |
| WO | WO2018-234916 | 12/2018 |
| WO | WO2018-236593 | 12/2018 |

OTHER PUBLICATIONS

Arkles, "Factors Contributing to the Stability of Alkoxysilanes in Aqueous Solution", Silanes and Other Coupling Agents, 1992, pp. 91-104.

Kirk-Othmer, Encyclopedia of Chemical Technology, John Wiley and Sons, New York, 1979, Third Edition, vol. 8, pp. 900-912.

International Search Report for PCT International Application No. PCT/US2019/041333, mailed on Oct. 7, 2019, 4 pages.

* cited by examiner

*Primary Examiner* — Jessica M Roswell

(74) *Attorney, Agent, or Firm* — Julie Lapos-Kuchar

(57) ABSTRACT

Described herein is a coating composition comprising: (a) a zwitterionic compound comprising (i) sulfonate-functional groups and (ii) alkoxysilane groups and/or silanol-functional groups; (b) an acid-catalyzed hydrolysis product of an alkoxylsilane, wherein the acid-catalyzed hydrolysis product of an alkoxylsilane comprises at least one (i) $(RO)_{(4-a)}Si(OH)_a$ where R is a monovalent hydrocarbon group and a is an integer from 1 to 4; or (ii) an alkanol silicate acid oligomer; (c) a water-miscible organic solvent; and (d) water, along with articles thereof and methods of making the same.

15 Claims, No Drawings

SULFONATE-FUNCTIONAL COATING COMPOSITIONS, METHODS OF MAKING THE SAME, AND ARTICLES THEREFROM

CROSS REFERENCE TO RELATED APPLICATIONS

This application is a national stage filing under 35 U.S.C. 371 of PCT/US2019/041333, filed Jul. 11, 2019, which claims the benefit of U.S. Application No. 62/700,411, filed Jul. 19, 2018, the disclosure of which is incorporated by reference in its/their entirety herein.

TECHNICAL FIELD

Coating compositions resulting in modification of the surface properties (such as making the surface easy to clean and/or super hydrophilic) are discussed, along with methods of making such coating compositions and articles derived therefrom.

BACKGROUND

Coatings are applied to surfaces for a variety of reasons, to modify the surface's appearance, modify its hydrophilicity/hydrophobicity, protect the surface from damage, etc. In some embodiments, the surface can be treated to make it easier to be cleaned. It can be desirable to have a thick layer of the coating, because with use and cleaning, the coating layer can be diminished in thickness, leaving the substrate surface no longer modified and/or protected.

SUMMARY

There is a desire to identify a coating composition that changes the properties (such as hydrophilicity and/or ability to clean) of a surface, while also being able to be coated at a substantial coating thickness and in some embodiments, coated in a single pass.

In one aspect, a coating composition is described, the coating composition comprising (a) a zwitterionic compound comprising (i) sulfonate-functional groups and (ii) alkoxysilane groups and/or silanol-functional groups;

(b) an acid-catalyzed hydrolysis product of an alkoxylsilane, wherein the acid-catalyzed hydrolysis product of an alkoxylsilane comprises at least one (i) $(RO)_{(4-a)}Si(OH)_a$ where R is a monovalent hydrocarbon and a is an integer from 1 to 4; or (ii) an alkanol silicate acid oligomer;

(c) a water-miscible organic solvent; and (d) water

In another aspect, a method is described, the method comprising:

contacting (a) an acid-catalyzed hydrolysis product of an alkoxysilane with (b) a zwitterionic compound, wherein the zwitterionic compound comprises (i) sulfonate-functional groups and (ii) alkoxysilane groups and/or silanol-functional groups; (c) a water-miscible organic solvent; and (d) water to form a coating composition.

In one embodiment, the acid-catalyzed hydrolysis product of an alkoxylsilane is derived from an alkoxysilane and a weak acid.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list. For example, "comprises at least one of" A, B, and C refers to element A by itself, element B by itself, element C by itself, A and B; A and C; B and C; and a combination of all three.

The terms "polymer" and "polymeric material" include, but are not limited to, organic homopolymers, copolymers, such as for example, block, graft, random, and copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The term "and/or" means one or all the listed elements or a combination of any two or more of the listed elements.

Also herein, recitation of ranges by endpoints includes all numbers subsumed within that range (e.g., 1 to 10 includes 1.4, 1.9, 2.33, 5.75, 9.98, etc.).

Groupings of alternative elements or embodiments disclosed herein are not to be construed as limitations. Each group member may be referred to and claimed individually or in any combination with other members of the group or other elements found therein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

DETAILED DESCRIPTION

U.S. Pat. No. 9,340,683 (Jing et al.) discloses coating compositions providing surfaces capable of being easily cleaned. Jing et al. exemplified a sulfonate-functional coating applied to a substrate, wherein fingerprints were removed using water vapor and wiping with a tissue.

For maximum durability, thick coating layers (such as at least or greater than 500 nm) are desirable. A thick coating can be achieved by repetitive coating of a dilute coating composition, however this can be time consuming. Thus, it is desirable to achieve a thick coating by applying a more concentrated coating composition onto a substrate surface. It has been discovered that coating compositions such as those exemplified in Jing et al. when coated at large thicknesses crack upon drying and/or curing.

In the present disclosure, the coating compositions disclosed herein not only change the properties of a surface (such as making it super hydrophilic and/or easy to clean), the coating compositions disclosed herein can be coated in a single coating pass and/or result in a thick coating layer that has good chemical resistance (e.g., exposure to steam and/or 24-hour water exposure).

The coating compositions disclosed herein comprise a zwitterionic compound, an acid-hydrolyzed alkoxysilane, an organic solvent, and water.

Zwitterionic Compound

The zwitterionic compound comprises sulfonate-functional groups and (i) alkoxysilane groups and/or (ii) silanol-functional groups;

Examples of zwitterionic sulfonate-functional compounds include those disclosed in U.S. Pat. No. 5,936,703 (Miyazaki et al.) and International Publication Nos. WO 2007/146680 (Schlenoft) and WO 2009/119690 (Yamazaki et al.), herein incorporated by reference.

In certain embodiments, the zwitterionic sulfonate-functional silane compounds used in the present disclosure have the following Formula (I) wherein:

$$(R^1O)_p—Si(Q^1)_q\text{-}X—N^+(Y^1Y^2)—(Z)—SO_3^- \qquad (I)$$

Wherein each $R^1$ is independently a hydrogen, methyl group, or ethyl group. Each $Q^1$ is independently selected from hydroxyl, alkyl groups containing from 1 to 4 carbon atoms and alkoxy groups containing from 1 to 4 carbon atoms. Exemplary $Q^1$ include —OH, $—CH_3$, $—CH_2CH_3$, $—CH_2CH_2CH_3$, $—CH_2CH(CH_3)_2$, $—CH(CH_3)_2$, $—OCH_3$, $—OCH_2CH_3$, $—OCH_2CH_2CH_3$, $—OCH_2CH(CH_3)_2$, and $—OCH(CH_3)_2$. The value "p" is 1, 2, or 3 and q is 0, 1, or 2; wherein the sum of p and q is 3. X is a divalent alkylene group comprising at least 2, 3 or even 4 carbon atoms and no more than 6, 8, 10 or even 12 carbon atoms and optionally comprising at least one ether (—O—), at least one carbamate (—OC═ON(H)—), and/or at least one urea (—NHC═ONH—) linkage. Exemplary X's include: $—CH_2CH_2—$, $—CH_2CH_2CH_2—$, $—CH_2CH_2CH_2CH_2CH_2—$, $—CH_2(CH_2)_5CH_2—$, $—(CH_2)_rNHC═ONH(CH_2)_s—$, $—(CH_2)_rNHC═OO(CH_2)_s—$, $—(CH_2)_rNHC═OO(CH_2)_tO(CH_2)_s—$, and $—CH_2CH(CH_3)—$ wherein r is 1, 2, 3, 4, or 5; s is 1, 2, 3, 4, or 5, and t is 1, 2, or 3. $Y^1$ and $Y^2$ are monovalent alkyl groups, independently comprising 1 or 2 carbon atoms. Exemplary $Y^1$ and $Y^2$ include $—CH_3$, and $—CH_2CH_3$. Z is a divalent alkylene group comprising at least 2, 3 or even 4 carbon atoms and no more than 6, 8, 10 or even 12 carbon atoms and optionally comprising a pendent hydroxyl group. Exemplary Z's include: $—CH_2CH_2—$, $—CH_2CH_2CH_2—$, $—CH_2CH(OH)CH_2—$, $—CH_2CH_2CH_2CH_2—$, $—CH_2(CH_2)_5CH_2—$, and $—CH_2CH(CH_3)—$.

In certain embodiments, the zwitterionic sulfonate-functional silane compounds used in the present disclosure have the following Formula (II) wherein:

$$(R^1O)_p—Si(Q^1)_q\text{-}(X)_r\text{-(pyradinyl)-}(Z)—SO_3^- \qquad (II)$$

Wherein each $R^1$ is independently a hydrogen, methyl group, or ethyl group. Each $Q^1$ is independently selected from hydroxyl, alkyl groups containing from 1 to 4 carbon atoms and alkoxy groups containing from 1 to 4 carbon atoms. Exemplary $Q^1$ include —OH, $—CH_3$, $—CH_2CH_3$, $—CH_2CH_2CH_3$, $—CH_2CH(CH_3)_2$, $—CH(CH_3)_2$, $—OCH_3$, $—OCH_2CH_3$, $—OCH_2CH_2CH_3$, $—OCH_2CH(CH_3)_2$, and $—OCH(CH_3)_2$. The value "p" is 1, 2, or 3 and q is 0, 1, or 2; wherein the sum of p and q is 3. The value "r" is 0 or 1. X is a divalent alkylene group comprising at least 2, 3 or even 4 carbon atoms and no more than 6, 8, 10 or even 12 carbon atoms. Exemplary X's include: $—CH_2CH_2—$, $—CH_2CH_2CH_2—$, $—CH_2CH_2CH_2CH_2CH_2—$, $—CH_2(CH_2)_5CH_2—$, and $—CH_2CH(CH_3)—$. The pyridinyl is a divalent $—N^+C_5H_4—$ ring group, wherein the Z group and the $—(X)_r—Si(Q^1)_q$- are connected to the pyridinyl group in a para-, meta-, or ortho-arrangement. For example, X and Z are located in a para position on the ring structure. In one embodiment, the Z group is connected to the ring nitrogen and the X group is in the para position. In another embodiment, the X group is connected to the ring nitrogen and the Z group is in the para position. Z is a divalent alkylene group comprising at least 2, 3 or even 4 carbon atoms and no more than 6, 8, 10 or even 12 carbon atoms and optionally comprising a pendent hydroxyl group. Exemplary Z's include: $—CH_2CH_2—$, $—CH_2CH_2CH_2—$, $—CH_2CH(OH)CH_2—$, $—CH_2CH_2CH_2CH_2—$, $—CH_2(CH_2)_5CH_2—$, and $—CH_2CH(CH_3)—$.

In certain embodiments, the zwitterionic sulfonate-functional silane compounds used in the present disclosure have the following Formula (III) wherein:

$$(R^1O)_p—Si(Q^1)_q\text{-}CH_2CH_2CH_2—N^+(CH_3)_2—(CH_2)_m—SO_3^- \qquad (III)$$

Wherein each $R^1$ is independently a hydrogen, methyl group, or ethyl group. Each $Q^1$ is independently selected from hydroxyl, alkyl groups containing from 1 to 4 carbon atoms and alkoxy groups containing from 1 to 4 carbon atoms. Exemplary $Q^1$ include —OH, $—CH_3$, $—CH_2CH_3$, $—CH_2CH_2CH_3$, $—CH_2CH(CH_3)_2$, $—CH(CH_3)_2$, $—OCH_3$, $—OCH_2CH_3$, $—OCH_2CH_2CH_3$, $—OCH_2CH(CH_3)_2$, and $—OCH(CH_3)_2$. The value "p" is 1, 2, or 3 and q is 0, 1, or 2; wherein the sum of p and q is 3. The value "m" is and integer of 1 to 11, preferably 1 to 6, more preferably 1 to 4. Suitable examples of zwitterionic sulfonate-functional compounds of Formula (III) are described in U.S. Pat. No. 5,936,703 (Miyazaki et al.), including, for example:

$$(CH_3O)_3Si—CH_2CH_2CH_2—N^+(CH_3)_2—CH_2CH_2CH_2—SO_3—;\ \text{and}$$

$$(CH_3CH_2O)_2Si(CH_3)—CH_2CH_2CH_2—N^+(CH_3)_2—CH_2CH_2CH_2—SO_3^-.$$

Other examples of suitable zwitterionic sulfonate-functional silane compounds, which may be made using standard techniques include the following:

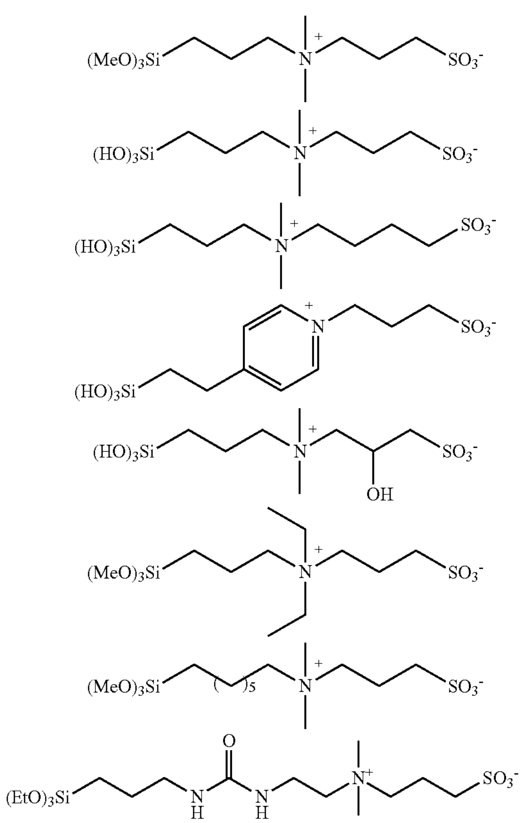

and

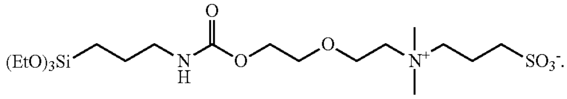

wherein Me refers to a methyl group and Et refers to an ethyl group.

In one embodiment, the coating composition of the present disclosure comprises at least 0.1, 0.2, 0.5, or even 1 wt % of the zwitterionic compound and at most 5, 10, or even 20 wt % of the zwitterionic compound based on the total weight of the coating composition.

Acid Catalyzed Hydrolysis Product of an Alkoxysilane

In the present disclosure, it has been discovered that the use of a reactive silanol-containing species in the sulfonate-functional coating composition enables thicker coatings to be achieved, while enhancing the chemical resistance of the resulting coating layer.

In one embodiment, the acid-catalyzed hydrolysis product of the alkoxysilane comprises a reactive silanol-containing species of (i) $(RO)_{(4-a)}Si(OH)_a$ where R is a monovalent hydrocarbon group and a is an integer from 1 to 4; and/or (ii) an alkanol silicate acid oligomer. In one embodiment, R is monovalent hydrocarbon group comprising 1 to 4, or even 1 to 2 carbon atoms. Exemplary R groups include: $—CH_3$, $—CH_2CH_3$, $—CH_2CH_2CH_3$, $—CH_2CH(CH_3)_2$ and $—CH(CH_3)_2$. In one embodiment, the alkanol silicate acid oligomer comprises a $C_1$ to $C_2$ alkanol.

Such acid-catalyzed hydrolysis product of the alkoxysilane may be formed using techniques known in the art. In one embodiment, the alkoxysilane compound can be hydrolyzed by contacting an alkoxysilane with a weak acid. Exemplary alkoxysilane compounds include tetraalkoxysilane, such as tetraethylorthosilicate (TEOS) and tetramethylorthosilicate (MEOS), and oligomeric forms of tetraalkoxysilane, such as alkyl polysilicates (e.g., poly(diethoxysiloxane)). Weak acids include acids having a pKa of at least 2.0, 3.0, or 3.5; and at most 4.0, 5.0 or even 6.0, for sample, as measured in water at ambient conditions following methods such as that disclosed in Albert, et al. "Ionization Constants of Acids and Bases: a Laboratory Manual", Wiley, Methuen, London, 1962. In one embodiment, weak acids include acids having a boiling point of less than 200° C., 180° C., 150° C., or even 125° C. Exemplary weak acids include carboxylic acids, such as acetic acid (pKa=4.76 at 25° C.) and propanoic acid (pKa=4.86 at 25° C.), and phosphonic acid (pKa=2.0).

When an alkoxysilane compound is hydrolyzed by acid, the compound not only undergoes hydrolysis, but also condensation of silanol species, generating an alkanol silicate acid oligomer. In one embodiment, the alkanol silicate acid oligomer is a molecule of the formula —SiO—Si(R)(OR')—OSi—, wherein R is a monovalent hydrocarbon group comprising 1 to 4, or even 1 to 2 carbon atoms and R' is H or a monovalent hydrocarbon group comprising 1 to 4, or even 1 to 2 carbon atoms. In one embodiment, the alkanol silicate acid oligomer has a number average molecular weight of at least 150, 200, 250, 300, 400, or even 500 daltons, and at most 1,000, or even 2,000 daltons.

The hydrolyzed silane is very reactive thus, after initiating hydrolysis, it should be used within a short time frame such as within 24 hours.

In one embodiment, the coating composition of the present disclosure comprises at least 0.1, 0.2, 0.5, or even 1 wt % of the acid-catalyzed hydrolysis product of an alkoxysilane and at most 5 or even 10 wt % of acid-catalyzed hydrolysis product of an alkoxysilane versus the total weight of the coating composition. It is noted that coating composition can contain volatile reagents and that the hydrolysis of the alkoxysilane can generate volatile species, such as ethanol or acetic acid. Thusly, for simplicity purposes, the total weight of the coating composition as used herein is a theoretic value determined based on the total weight of the reagents added to the coating composition, and not an actual weight of the coating composition.

Solvents

The sulfonate-functional coating composition preferably includes water and a water-miscible organic solvent, that will dissolve the alkoxysilane. A water miscible solvent refers to a solvent that can be dissolved or mixed with water in any proportion under ambient conditions without separating.

Exemplary water miscible solvents include lower alcohols (e.g., $C_1$ to $C_8$ alcohols, and more typically $C_1$ to $C_4$ alcohols), such as methanol, ethanol, propanol, 2-propanol, 1-methoxy-2-propanol, and glycol ethers such as those available under the trade designation "DOWANOL DPM" from Dow Chemical Co., Midland, MI.

Typically, the solvents are present in an amount up to 50% by weight of the coating composition and preferably in the range of 5-50% by weight of the coating compositions.

In one embodiment, the coating composition of the present disclosure comprises at least 50, 75, 80 or even 85 wt % of water.

Typically, coating compositions having a high solids content are advantageous for ease of generating thicker coating layers. In one embodiment, the coating compositions of the present disclosure have a solid content of at least 1, 2, 4, 5, or even 6 wt % and at most 10, 15, or even 20 wt % based on the total weight of the zwitterionic compound and the acid-catalyzed hydrolysis product of an alkoxysilane.

Optional Additives

Additives, including but not limited to those described below, may be added to the coating composition to aid in application or processing of the coating composition, and/or appearance of the resulting coating layer. In one embodiment, the coating compositions disclosed herein are substantially free of additives, meaning the coating compositions comprise less than 1, 0.5, 0.1, 0.05, or even 0.01% by weight of the additive based on the total weight of the coating composition.

In one embodiment, conventional surfactants, including cationic, anionic, nonionic, and zwitterionic surfactants can be used. The term "surfactant" as used herein describes molecules comprising hydrophilic (polar) and hydrophobic (non-polar) regions on the same molecule which are capable of reducing the surface tension of the coating composition. Suitable surfactants that may be used are commercially available from a number of sources. For a discussion of suitable surfactants, see Kirk-Othmer, Encyclopedia of Chemical Technology, Third Edition, volume 8, pages 900-912 and U.S. Pat. No. 6,040,053 (Scholz et al.). In one embodiment, the surfactant is an anionic surfactant comprising (1) at least one hydrophobic moiety, such as $C_6$-$C_{20}$ alkyl, alkylaryl, and/or alkenyl groups, (2) at least one anionic group, such as sulfate, sulfonate, phosphate, polyoxyethylene sulfate, polyoxyethylene sulfonate, polyoxyethylene phosphate, and the like, and/or (3) the salts of such anionic groups, wherein said salts include alkali metal salts, ammonium salts, tertiary amino salts, and the like. Exemplary surfactants may include an alkyl sulfate, alkyl ether sulfate, alkyl ethoxylate, and combinations thereof. Representative commercial examples of useful anionic surfactants include sodium lauryl sulfate, available under the trade designation "TEXAPON L-100" from Henkel Inc., Wilmington, DE, or under the trade designation "POLYSTEP B-3" from Stepan Chemical Co, Northfield, IL; sodium lauryl ether sulfate, available under the trade designation "POLYSTEP B-12" from Stepan Chemical Co., Northfield, IL; ammonium lauryl sulfate, available under the trade designation "STANDAPOL A" from Henkel Inc., Wilmington, DE; and sodium dodecyl benzene sulfonate, available under the trade designation "SIPONATE DS-10" from Rhone-Poulenc, Inc., Cranberry, NJ.

In some embodiments coating compositions of the present disclosure include a surfactant in an amount of at least 0.001, 0.01, 0.1, 1, 2, or even 3 wt % based on the total weight of the coating composition. In some embodiments, compositions of the present disclosure, include a surfactant in an amount of up to 1, 3, 5, or even 10 wt % based on the total weight of the coating composition.

Certain embodiments of the coating compositions of the present disclosure may include one or more other additives. Suitable additives according to the present disclosure may include, for example, dyes (product safety/identification), fragrances, corrosion inhibitors, enzymes, and/or thickeners. Suitable thickeners may include, for example, gums (e.g., xanthan, carrageenan, etc.), polymers (e.g., polyacrylates and similar modified polymers), inorganic particles (e.g., clay silicates such as LAPONITE).

Various additional additives suitable for use according to the present disclosure are disclosed in U.S. Pat. No. 6,916,773 (Griese et al.) and U.S. Pat. No. 8,772,215 (Ryther et al.), and U.S. Pat. App. Pub. Nos. 2010/0317559 (Ryther et al.), 2012/0295829 (Peitersen et al.), and 2013/0023458 (Hodge et al.), herein incorporated by reference.

In one embodiment, the coating compositions of the present disclosure are substantially free of inorganic particles, such as glass and/or ceramic particles including silica nanoparticles. As used herein, substantially free of inorganic particles means that the coating composition and/or the resulting coating layer comprise less than 1, 0.5, 0.1, 0.05, or even 0.01 wt % based on the total weight of the coating composition.

In one embodiment, the coating compositions of the present disclosure are substantially free of alkali metals and alkaline earth metals, including lithium, calcium and sodium. As used herein, substantially free of alkali metals and alkaline earth metal means that the coating composition and/or the resulting coating layer comprise less than 2.5, 2, 1.5, 1, 0.75, 0.5, 0.4, 0.3, 0.2, 0.1, 0.05, 0.01, or even 0.001 wt % of the alkali and alkaline earth metals.

In one embodiment, the coating composition is substantially free of a hydroxy-containing polymer selected from a polyvinyl alcohol, hydroxy methyl cellulose, hydroxyethyl cellulose, dextran, guar gum and combinations thereof, wherein substantially free means that the coating composition comprises less than 0.1, or even 0.01 wt % of the hydroxy-containing polymer based on the total weight of the coating composition.

Substrates

The substrates that can be coated with the coating compositions disclosed herein are only limited by those substrates that can be wetted with the coating composition. In other words, the receding contact angle of the coating composition disclosed herein on an embodied substrate is less than 30°, 25°, 20°, 15°, 10°, or 5°. Receding contact angles described herein are measured under ambient conditions. Receding contact angles can be measured using goniometric methods (e.g., using a Ramé-Hart goniometer from Ramé-Hart Instrument Co., Succasunna, NJ) or Wilhelmy plate techniques (e.g., using a Kruss Tensiometer from Kruss GmbH, Hamburg, Germany). One example of a goniometric method for measurement of receding contact angles of a fluid on a substrate is to measure the fluid coating solution contact angle as the coating solution is removed from a sessile droplet using a syringe (drop volume ~5 μL). Often, the type of surfactant, wetting agent, solvents, and or concentration of reagents can be adjusted to ensure wetting of the substrate surface. Thus, the substrates that can be coated include both inorganic substrates as well as organic polymer substrates, including blends and laminates thereof.

Exemplary organic substrates include, polyester (e.g., polyethylene terephthalate, polybutyleneterephthalate), polycarbonate, allyldiglycolcarbonate, polyacrylates (such as polymethylmethacrylate), polystyrene, polysulfone, polyethersulfone, polyphenylethersulfones, homo-epoxy polymers, epoxy addition polymers with polydiamines, polydithiols, polyolefins (such as polypropylene, polyethylene, and polyethylene copolymers), polyvinyl chloride (PVC), fluorinated polymers (such as tetrafluoroethylene/hexafluoropropylene/vinylidene fluoride terpolymer, polyvinylidene fluoride, and polyvinyl fluoride), cellulose esters (such as cellulose acetate or cellulose butyrates), and blends and combinations thereof.

Exemplary inorganic substrates include glass, ceramic, metal (such as aluminum or stainless steel) and mixtures thereof.

In one embodiment, the substrate may be provided with graphics, such as words or symbols as known in the art.

The substrate can be treated to improve adhesion between the substrate and the coating composition and/or improve wetting of the coating composition to the substrate, using, e.g., the addition of another substance such as a primer layer, metal deposition, or ceramic deposition; or modification of the existing surface such as air or nitrogen corona treatment, plasma treatment, flame treatment, or actinic radiation treatment.

In one embodiment, the coating compositions of the present disclosure are in direct contact with the substrate, with no intervening primer or hardcoat layer.

In another embodiment, the coating compositions of the present disclosure is not in direct contact with the substrate, comprising a coating (such as a primer or hardcoat layer) therebetween. Exemplary primers include thin coatings of polyvinylidene chloride (PVDC), vapor deposition or vapor coating to create an SiO or $SiO_2$ surface, nanoparticle-containing primers such as nanosilica, or a siliceous primer layer. Exemplary primers are disclosed in U.S. Prov. Appl. No. 62/523,984 (Jing et. al), U.S. Pat. No. 9,556,338 (Jing et al.), and U.S. Pat. Publ. No. 2016/0222223 (Jing et al.) which are all herein incorporated by reference.

Typically, the substrate is in the form of a film, sheet, panel or pane of material and may be a part of an article such as a computer case, a cell phone case, a computer screen, a cell phone screen, ophthalmic lenses, architectural glazings, decorative glass frames, motor vehicle windows and windshields, and protective eye wear, such as surgical masks and face shields. The coatings may, optionally if desired, cover only a portion of the article, e.g., only the section immediately adjacent the eyes in a face shield may be coated. The substrate may be flat, curved or shaped. The article to be coated may be produced by blowing, casting, extrusion, or injection molding.

Substrates used herein may be opaque or transparent or translucent to visible light. The term transparent means transmitting at least 85% of incident light in the visible spectrum (400-700 nm wavelength). Transparent substrates may be colored or colorless.

Method of Making

Due to the stability of the acid-catalyzed hydrolysis product of the alkoxylsilane, the reactive silanol-containing species is first formed and then contacted with the zwitterionic compound and other additives. The sulfonate-functional coating compositions are preferably coated on the substrate using conventional techniques, such as bar, roll, curtain, rotogravure, spray, or dip coating techniques. The preferred methods include bar and roll coating, or air knife coating to adjust thickness.

For thicker coating layers, the sulfonate-functional coatings of the present disclosure are preferably applied such that the resulting coatings have a dried thickness of at least 500 nm, 1 micron, or even 2 microns thick; and no more than 20, 50 or even 100 microns thick as measured using techniques known in the art, for example, calipers, micrometers, profilometer, or an ellipsometer such as a Gaertner Scientific Corp., Model No. L115C, Skokie, IL.

Sulfonate-functional coatings of the present disclosure can be coated on both sides of a substrate if desired. Alternatively, the coatings of the present disclosure may be coated on one side of the substrate. Once coated, the sulfonate-functional article is typically dried to at least partially remove the water-miscible organic solvent and/or water via heating or evaporation. The coating composition disclosed herein may be heated to cure and/or anneal to form the sulfonate-functional article. Typically, heating is done at temperatures of 20° C. to 150° C. in a recirculating oven. An inert gas may be circulated. The temperature may be increased further to speed the drying process, but care must be exercised to avoid damage to the substrate.

Coated Articles

The coating layer made from the coating composition disclosed herein includes an oligomeric and/or polymeric siloxane network (Si—O—Si) with hydrophilic functional groups pendant therefrom (e.g., sulfonate groups). Although not wanting to be limited by theory, the Si groups of the zwitterionic compound allow for attachment to the substrate surface and/or reaction with the acid-hydrolyzed silane to form a siloxane nextwork, increasing the durability of the coating. The sulfonate groups of the zwitterionic compound generates a hydrophilic surface. The amount of sulfonate groups used to make a cured surface layer is at least 12 molar-% or at least 25 weight-%, based on the entire amount of the resultant cured coating layer. The amount of hydrophilic functional compounds used to make a cured coating layer is up to 100 molar-%, based on the entire amount of the resultant cured coating layer.

In one embodiment, the coating compositions disclosed herein generates a superhydrophilic surface on an underlying substrate. A superhydrophilic surface is defined as one in which the advancing contact angle of water on the surface is less than 15°, 10°, 5°, 3°, or 1°. Advancing contact angles of water described herein are measured under ambient conditions using deionized water. Advancing contact angles can be measured using goniometric methods (e.g., using a Ramé-Hart goniometer from Ramé-Hart Instrument Co., Succasunna, NJ) or Wilhelmy plate techniques (e.g., using a Kruss Tensiometer from Kruss GmbH, Hamburg, Germany). One example of a goniometric method for measurement of advancing contact angle of water on a substrate is to measure the contact angle of water as water is applied via a syringe into a sessile droplet (drop volume ~5 μL).

In one embodiment, the superhydrophilic coating provides anti-fog properties to surfaces coated therewith. The anti-fog property is demonstrated by the tendency of the coatings to resist the formation of water droplets which tend to significantly reduce the transparency of the coated substrate. Water vapor from, for example, human breathing, tends to condense upon the coated substrate in the form of a thin uniform water film, rather than as water droplets. Such a uniform film does not significantly reduce the clarity or transparency of the substrate.

Alternatively, or additionally, the coating compositions disclosed herein generate an easy to clean surface. For example, fingerprints can be easily removed from the sulfonate-functional coating of the present disclosure with wiping, preferably after first applying water and/or water vapor (e.g., by breathing) to the fingerprints. Typically, methods of the present disclosure include removing fingerprints (by this it is meant, substantially all the skin oils deposited as a fingerprint) from the sulfonate-functional surface by simply applying water (e.g., tap water at room temperature) and/or water vapor (e.g., a person's breath) and wiping. Herein, "wiping" refers to gentle wiping, typically by hand, with for example, a tissue, paper towel, or a cloth, without significant pressure (e.g., generally, no more than 350 grams) for one or more strokes or rubs (typically, only a few are needed).

Alternatively, or additionally, the coating compositions disclosed herein generate a surface layer having good chemical resistance, specifically good chemical resistance to steam and/or 24-hour water immersion testing.

In one embodiment, the sulfonate-functional coating of the present disclosure may not be negatively impacted (e.g., reduced product performance) when used on articles, which are then exposed to low molecular weight materials, including plasticizers and catalysts, which can volatilize on aging and become sorbed into the coating, impacting performance.

The coating compositions disclosed herein may used to coat surface to enable easy cleaning, hydrophillicy, chemical resistance, and/or abrasion resistance. Exemplary article utilizing the coating compositions disclosed herein may include: protective eyewear, such as surgical masks and face shields, as well as ophthalmic lenses; windows and windshields; cell phone screens and components; keypads; touchscreens; sensors (such as vehicle sensors); microreplicated films, and rewritable writing surfaces (such as dry erase surfaces).

Exemplary embodiments of the present disclosure, include, but are not limited to the following:

Embodiment 1. A coating composition comprising (a) a zwitterionic compound comprising (i) sulfonate-functional groups and (ii) alkoxysilane groups and/or silanol-functional groups; (b) an acid-catalyzed hydrolysis product of an alkoxylsilane, wherein the acid-catalyzed hydrolysis product of an alkoxylsilane comprises at least one (i) $(RO)_{(4-a)}Si(OH)_a$ where R is a monovalent hydrocarbon group and a is an integer from 1 to 4; or (ii) an alkanol silicate acid oligomer;

(c) a water-miscible organic solvent; and (d) water.

Embodiment 2. The coating composition of embodiment 1, wherein the zwitterionic compound is of Formula (I) $(R^1O)_p$—$Si(Q^1)_q$-X—$N^+(Y^1Y^2)$—(Z)—$SO_3^-$ (I)

wherein each $R^1$ is independently a hydrogen, methyl group, or ethyl group;

each $Q^1$ is independently selected from hydroxyl, alkyl groups containing from 1 to 4 carbon atoms and alkoxy groups containing from 1 to 4 carbon atoms;

p is 1, 2, or 3;

q is 0, 1, or 2;

p+q=3;

X is a divalent alkylene group comprising at least 2, and no more than 12 carbon atoms and optionally comprising at least one ether linkage, at least one carbamate linkage, and/or at least one urea linkage; $Y^1$ and $Y^2$ are each independently a monovalent alkyl group; and Z is a divalent alkylene group comprising at least 2 and no more than 12 carbon atoms and optionally comprising a pendent hydroxyl group.

Embodiment 3. The coating composition of any one of the previous embodiments, wherein the zwitterionic compound is of Formula (III)

$$(R^1O)_p\text{—}Si(Q^1)_q\text{-}CH_2CH_2CH_2\text{—}N^+(CH_3)_2\text{—}(CH_2)_m\text{—}SO_3^- \quad \text{(III)}$$

wherein:

each $R^1$ is independently a hydrogen, methyl group, or ethyl group; each $Q^1$ is independently selected from hydroxyl, alkyl groups containing from 1 to 4 carbon atoms and alkoxy groups containing from 1 to 4 carbon atoms; p and m are integers of 1 to 4; q is 0 or 1; and p+q=3.

Embodiment 4. The coating composition of embodiment 1, wherein the zwitterionic compound is of Formula (II)

$$(R^1O)_p\text{—}Si(Q^1)_q\text{-}(X)_r\text{-}(pyradinyl)\text{-}(Z)\text{—}SO_3^- \quad \text{(II)}$$

Wherein each $R^1$ is independently a hydrogen, methyl group, or ethyl group; each $Q^1$ is independently selected from hydroxyl, alkyl groups containing from 1 to 4 carbon atoms and alkoxy groups containing from 1 to 4 carbon atoms; p is 1, 2, or 3; q is 0, 1, or 2; p+q=3; r is 0 or 1; X is a divalent alkylene group comprising at least 2, and no more than 12 carbon atoms and optionally comprising at least one ether linkage, at least one carbamate linkage, and/or at least one urea linkage; pyridinyl is a divalent pyridine group; and Z is a divalent alkylene group comprising at least 2 and no more than 12 carbon atoms and optionally comprising a pendent hydroxyl group.

Embodiment 5. The coating composition of any one of the previous embodiments, wherein the zwitterionic compound is selected from at least one of:

$$(CH_3O)_3Si\text{—}CH_2CH_2CH_2\text{—}N^+(CH_3)_2\text{—}CH_2CH_2CH_2\text{—}SO_3^-$$

$$(CH_3CH_2O)_2Si(CH_3)\text{—}CH_2CH_2CH_2\text{—}N^+(CH_3)_2\text{—}CH_2CH_2CH_2\text{—}SO_3^-$$

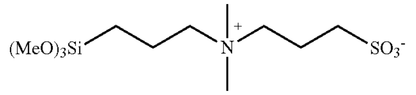

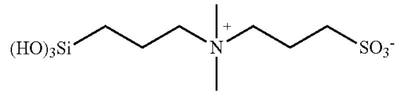

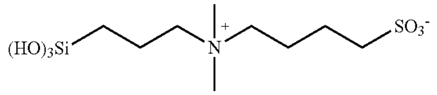

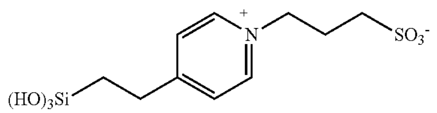

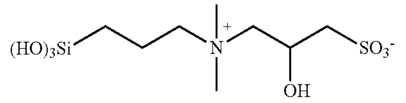

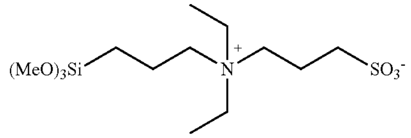

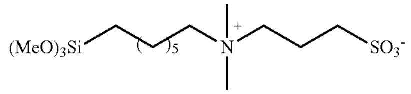

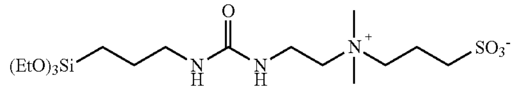

and

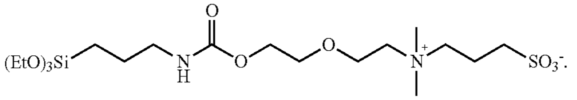

Embodiment 6. The coating composition of any one of the previous embodiments, wherein the acid-catalyzed hydrolysis product of an alkoxysilane comprises $(RO)_{(4-a)}Si(OH)_a$ and R is a monovalent hydrocarbon group comprising 1 or 2 carbon atoms and a is an integer from 1 to 4.

Embodiment 7. The coating composition of any one of the previous embodiments, wherein the alkanol silicate acid oligomer comprises a C1 to C2 alkanol.

Embodiment 8. The coating composition of any one of the previous embodiments, wherein the alkanol silicate acid oligomer has a molecular weight of less than 1,000 daltons.

Embodiment 9. The coating composition of any one of the previous embodiments, wherein the water-miscible organic solvent is selected from at least one of methanol, ethanol, isopropanol, and 1-methoxy-2-propanol.

Embodiment 10. The coating composition of any one of the previous embodiments, wherein the coating composition comprises at least 0.1 wt % of the zwitterionic compound.

Embodiment 11. The coating composition of any one of the previous embodiments, wherein the coating composition comprises at least 0.1 wt % of the acid-catalyzed hydrolysis product of the alkoxysilane.

Embodiment 12. The coating composition of any one of the previous embodiments, wherein the coating composition comprises at least 75 wt % of the water.

Embodiment 13. The coating composition of any one of the previous embodiments, wherein the coating composition comprises at least 0.1% solids.

Embodiment 14. The coating composition of any one of the previous embodiments, wherein the coating composition comprises less than 2.5 wt % of an alkali or alkaline earth metal.

Embodiment 15. The coating composition of any one of the previous embodiments, wherein the coating composition is substantially free of inorganic particles.

Embodiment 16. The coating composition of any one of the previous embodiments, wherein the coating composition comprises a surfactant.

Embodiment 17. The coating composition of embodiment 16, wherein the surfactant is selected from an alkyl sulfate, alkyl ether sulfate, alkyl ethoxylate, and combinations thereof.

Embodiment 18. An article comprising a substrate with a coating layer thereon, wherein the coating layer is preparable by combining the components comprising: (a) a zwitterionic compound comprising (i) sulfonate-functional groups and (ii) alkoxysilane groups and/or silanol-functional groups; (b) an acid-catalyzed hydrolysis product of an alkoxylsilane, wherein the acid-catalyzed hydrolysis product of an alkoxylsilane comprises at least one (i) $(RO)_{(4-a)}Si(OH)_a$ where R is a monovalent hydrocarbon group and a is an integer from 1 to 4; or (ii) an alkanol silicate acid oligomer; (c) a water-miscible organic solvent; and (d) water.

Embodiment 19. The article of embodiment 18, wherein the coating layer has a thickness of at least 100 nm.

Embodiment 20. The article of any one of embodiments 18-19, wherein the receding contact angle of the preparable coating layer on the substrate is less than 30 degrees.

Embodiment 21. The article of any one of embodiments 18-20, wherein the substrate is at least one of a corona-treated polyethylene terephtalate and nano-silica coated polyethylene terephtalate.

Embodiment 22. The article of any one of embodiments 18-21, wherein the article is a sensor.

Embodiment 23. A method comprising:

contacting (a) an acid-catalyzed hydrolysis product of an alkoxysilane with (b) a zwitterionic compound, wherein the zwitterionic compound comprises (i) sulfonate-functional groups and (ii) alkoxysilane groups and/or silanol-functional groups; (c) a water-miscible organic solvent; and (d) water to form a coating composition.

Embodiment 24. The method of embodiment 23, wherein the acid-catalyzed hydrolysis product of an alkoxysilane is derived from an alkoxysilane and a weak acid.

Embodiment 25. The method of embodiment 24, wherein the alkoxysilane is a tetraalkoxysilane comprising 1-4 carbon atoms per alkoxy group.

Embodiment 26. The method of any one of embodiments 24-25, wherein the weak acid has a boiling point of less than 200° C. at ambient pressure.

Embodiment 27. The method of any one of embodiments 24-26, wherein the weak acid is at least one of a carboxylic acid and a phosphonic acid.

Embodiment 28. The method of any one of embodiments 23-27, further comprising contacting the coating composition to a substrate surface.

Embodiment 29. The method of embodiment 28, wherein the receding contact angle of the coating composition disclosed herein on an embodied substrate is less than 30 degrees.

Embodiment 30. The method of any one of embodiments 28-29 wherein the substrate is a polyethylene terephthalate.

Embodiment 31. The method of embodiment 30, wherein the surface of the polyethylene terephthalate is corona-treated, comprises a silica layer, or comprises a primer.

Embodiment 32. The method of any one of embodiments 28-31, further comprising at least partial removal of the water-miscible organic solvent and water to form a layer.

Embodiment 33. The method of embodiment 32, wherein the layer has a thickness of at least 100 nm.

EXAMPLES

Unless otherwise noted, all parts, percentages, ratios, etc. in the examples and the rest of the specification are by weight (wt), and all reagents used in the examples were obtained, or are available, from general chemical suppliers such as, for example, Sigma-Aldrich Company, Saint Louis, Missouri, or may be synthesized by conventional methods.

These abbreviations are used in the following examples: cm=centimeter, g=grams, ° C.=degrees Celsius, mL=milliliter, and nm=nanometer.

| Material designation | Description |
|---|---|
| TEOS | Tetraethoxysilane was obtained from Alfa Aesar (Tewksbury, MA). |
| Surfactant | Sodium lauryl ether sulfate, sold under trade designation "POLYSTEP B-430S," available from Stepan, Inc. (Northfield, IL). |
| Zwitterionic silane | 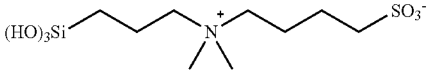 Zwitterionic silane of the structure shown was prepared according to the procedure described in U.S. Pat. No. 9,340,683. |
| Lithium silicate | Lithium silicate, sold under trade designation "LSS-75" available from Nissan Chemical Co. (Houston, TX). |
| Ethanol | Anhydrous ethanol (denatured with methanol) was obtained from EMD Millipore (Darmstadt, Germany). |
| Acetic acid | Glacial acetic acid was obtained from EMD Millipore (Darmstadt, Germany). |

-continued

| Material designation | Description |
|---|---|
| Nano-silica primed PET | Refers to a film of polyethylene terephthalate (PET) of thickness 2.0 mils (about 50.8 micron) coated with a layer of sintered silica nanoparticles. This coating was prepared as described in Example 25 of U.S. Pat. No. 9,556,338 (Jing et al.). |
| Corona-treated PET | A film of PET of thickness 5.0 mils (about 127 micron) with an abrasion-resistant coating available under trade designation "MARNOT ADVANCED" was obtained from Tekra, Inc. (New Berlin, WI). The coated side of the film was treated with air corona before use. |

Test Methods

% Haze:

Haze measurements were made using a BYK Haze-Gard Plus, Model No. 4725 (BYK-Gardner USA, Columbia, Maryland), an integrating sphere instrument having 0°/diffuse geometry and CIE standard illuminant C. Samples were placed directly at the haze port for measurement of haze. Reported values are an average of three measurements. Error values are reported as one standard deviation.

Wet Abrasion Resistance:

Coated samples were first soaked in deionized water overnight and allowed to air dry for at least 1 hour prior to testing to eliminate residual coating surfactant that might affect the test.

In a 1000 mL covered beaker, 400 mL of water was heated to 60° C. The lid contained a circular cut opening of 4 cm diameter, which was covered with a metal plate. The plate was removed, and the coated sample was immediately placed over the opening with the coated side facing the inside of the beaker and left there for 60 seconds. Immediately after removing from the water vapor, the sample was rubbed 5 times with a low lint wiper available under trade designation "KIMTECH" (Kimberly-Clark, Roswell, GA) using moderate pressure. Damage to the coating was graded visually as follows: P=pass (the coating is unaffected), VSF=very slight fail (a few light scratches are visible), SF=slight fail (significant scratching is visible), F=fail (the coating is heavily scratched or mostly removed), or BF=big fail (the coating is completely wiped away).

Preparative Example 1 (PE-1): Acid-Catalyzed Hydrolysis Product of TEOS

A jar was charged with 0.50 g of acetic acid, 24.0 g of ethanol, 15.5 g of water, and 10.0 g of TEOS. This solution was stirred for 4 hours. An additional 50.0 g of water was added, and the resulting solution was stirred overnight. The resulting hydrolyzed TEOS solution was used for coatings within 24 hours.

Comparative Examples 1-5 (CE 1-5)

Stock solutions were prepared by diluting lithium silicate and zwitterionic silane to 10 wt % solids in water. Surfactant was diluted to 1 wt % solids by weight. The coating solutions were then prepared by mixing stock solutions in the amounts shown in table 2 to form a clear and colorless solution. Each solution contained about 4 wt % solids.

TABLE 2

| Example | Ratio of zwitterion:lithium silicate | 10% zwitterion | 10% lithium silicate | 1% Surfactant | water |
|---|---|---|---|---|---|
| CE-1 | 2:1 | 800 mg | 400 mg | 30 mg | 1.77 g |
| CE-2 | 3:2 | 720 mg | 480 mg | 30 mg | 1.77 g |
| CE-3 | 1:1 | 600 mg | 600 mg | 30 mg | 1.77 g |
| CE-4 | 2:3 | 480 mg | 720 mg | 30 mg | 1.77 g |
| CE-5 | 1:2 | 400 mg | 800 mg | 30 mg | 1.77 g |

The solutions were coated on nanosilica-primed PET using a #12 wire-wound rod (BYK, inc., Wallingford, CT). The coatings were dried by blowing air over the films with a heat gun. The dried coatings were then cured in an oven held at 130° C. for 10 minutes.

Examples 1-5 (EX 1-5)

Stock solutions containing 10 wt % zwitterionic silane, 20 wt % zwitterionic silane, and 1 wt % Surfactant were prepared by diluting concentrated solutions with appropriate amounts of deionized water. The hydrolyzed TEOS solution described in PE-1 contained an estimated 2.88% solids. This assumes that upon curing TEOS condenses to $SiO_2$. The stock solutions were mixed in the amounts shown in Table 3 to make clear and colorless coating solutions containing 4% solids.

TABLE 3

| Example | Ratio of zwitterion: hydrolyzed TEOS | 10% zwitterion | 20% zwitterion | 2.88% hydrolyzed TEOS | 1% Surfactant | water |
|---|---|---|---|---|---|---|
| EX-1 | 2:1 | 533 mg | 0 | 925 mg | 20 mg | 522 mg |
| EX-2 | 3:2 | 480 mg | 0 | 1.11 g | 20 mg | 390 mg |
| EX-3 | 1:1 | 400 mg | 0 | 1.39 g | 20 mg | 190 mg |
| EX-4 | 2:3 | 320 mg | 0 | 1.66 g | 20 mg | 0 |
| EX-5 | 1:2 | 0 | 133 mg | 1.85 g | 20 mg | 0 |

The solutions were coated on nanosilica-primed PET using a #12 wire-wound rod available from BYK, Inc. (Wesel, Germany). The coatings were dried by blowing air over the films with a heat gun. The dried coatings were then cured in an oven held at 130° C. for 10 minutes.

Samples of coated films EX 1-5 and CE 1-5 were soaked in deionized water overnight, then allowed to air dry for one hour. The % haze was measured before and after soaking for each film following the % Haze test method and the percent change is haze is reported in Table 4. Samples of coated films EX 1-5 and CE 1-5 were also tested following the Wet Abrasion Resistance test method. The results are shown in Table 4.

TABLE 4

| Sample | Initial haze (%) | Haze after soaking (%) | Change in Haze after soaking (%) | Wet abrasion test result |
|---|---|---|---|---|
| CE-1 | 2.54 ± 0.09 | 5.71 ± 0.24 | 3.17 | Big Fail |
| CE-2 | 3.01 ± 0.49 | 9.32 ± 3.54 | 6.31 | Big Fail |
| CE-3 | 4.55 ± 0.76 | 10.30 ± 4.58 | 5.75 | Big Fail |
| CE-4 | 8.26 ± 1.17 | 24.0 ± 0.15 | 15.74 | Fail |
| CE-5 | 9.85 ± 1.17 | 20.8 ± 3.30 | 10.95 | Big Fail |
| EX-1 | 1.49 ± 0.05 | 1.98 ± 0.22 | 0.49 | Very Slight Fail |
| EX-2 | 2.27 ± 0.23 | 2.96 ± 0.41 | 0.69 | Slight Fail |
| EX-3 | 1.94 ± 0.04 | 2.75 ± 0.25 | 0.81 | Pass |
| EX-4 | 1.99 ± 0.04 | 2.25 ± 0.19 | 0.26 | Very Slight Fail |
| EX-5 | 10.60 ± 0.49 | 10.90 ± 1.95 | 0.30 | Slight Fail |

As shown in Table 4, the comparative examples had diminished water resistance, as shown by the increase in haze following soaking. The comparative examples also tended to have poorer performance in the wet abrasion test.

Comparative Example 6 (CE-6)

To show the importance of hydrolyzing the alkoxysilane before contact with the zwitterionic compound, a coating composition using the same mass amounts of components as in EX-3 was prepared except that the alkoxysilane was not hydrolyzed prior to contact with the zwitterionic compound. The coating composition was made as follows: A vial was charged with 4.00 g of 10 wt % zwitterionic silane in water, 11.0 g of water, 200 mg of 1 wt % Surfactant in water, 70 mg of acetic acid, 3.34 g of ethanol, and 1.39 g of TEOS. The resulting dispersion was stirred overnight. After stirring overnight, a precipitate formed, and the solution could not be used for coating.

Comparative Examples 7-9 (CE 7-9)

Coating solutions were prepared by mixing the stock solutions in the amounts shown in the Table 5 to generate coating layers having various thickness. The solutions were coated on corona-treated PET using wire-wound rods available from BYK, Inc. (Wesel, Germany). The rods used were #28, #16, and #6 for CE-7, CE-8, and CE-9, respectively. The coatings were dried by blowing air over the films with a heat gun. The dried coatings were then cured in an oven held at 130° C. for 10 minutes. The target dried coating thicknesses were 2.5 microns, 900 nm, and 100 nm for CE-7, CE-8, and CE-9, respectively.

TABLE 5

| Example | Wt % solids of a 1:1 ratio of zwitterion:lithium silicate | 10 wt % zwitterion | 10 wt % lithium silicate | 1 wt % Surfactant | water |
|---|---|---|---|---|---|
| CE-7 | 5% solids | 500 mg | 500 mg | 20 mg | 980 mg |
| CE-8 | 3.6% solids | 360 mg | 360 mg | 20 mg | 1.26 g |
| CE-9 | 1% solids | 100 mg | 100 mg | 20 mg | 1.78 g |

Examples 6-8 (EX 6-8)

Coating solutions were prepared by mixing the stock solutions in the amounts shown in table 6. The solutions were coated on corona-treated PET using wire-wound rods available from BYK, Inc. (Wesel, Germany). The rods used were #28, #16, and #6 for EX-6, EX-7, and EX-8, respectively. The coatings were dried by blowing air over the films with a heat gun. The dried coatings were then cured in an oven held at 130° C. for 10 minutes. The target coating thicknesses were 2.5 microns, 900 nm, and 100 nm for EX-6, EX-7, and EX-8, respectively.

TABLE 6

| Example | Wt % solids of a 1:1 ratio of zwitterion: hydrolyzed TEOS | 10% zwitterion | 20% zwitterion | 2.88% hydrolyzed TEOS | 1% Surfactant | water |
|---|---|---|---|---|---|---|
| EX-6 | 5% solids | 0 | 245 mg | 1.70 g | 20 mg | 0 |
| EX-7 | 3.6% solids | 577 mg | 0 | 1.00 g | 20 mg | 0 |
| EX-8 | 1% solids | 577 mg | 0 | 1.00 g | 80 mg | 4.12 g |

Samples of coated films EX 6-8 and CE 7-9 were visually inspected for appearance and then tested following the Wet Abrasion Resistance test method. The results are shown in Table 7.

TABLE 7

| Sample | Visual coating appearance before testing | Wet abrasion test result |
|---|---|---|
| CE-7 | Heavy cracking of the coating and heavy film curling | Big Fail |
| CE-8 | Cracking of the coating and film curling | Big Fail |
| CE-9 | No cracking or curling | Big Fail |
| EX-6 | No cracking or curling | Pass |
| EX-7 | No cracking or curling | Very slight fail |
| EX-8 | No cracking or curling | Pass |

As shown in table 7, the comparative examples demonstrated cracking at thicker coating layers (900 nm and 2.5 micron) and all of the comparative examples tended to have poorer performance in the wet abrasion test.

Foreseeable modifications and alterations of this invention will be apparent to those skilled in the art without departing from the scope and spirit of this invention. This invention should not be restricted to the embodiments that are set forth in this application for illustrative purposes. To the extent that there is any conflict or discrepancy between this specification as written and the disclosure in any document mentioned or incorporated by reference herein, this specification as written will prevail.

What is claimed is:

1. A coating composition consisting of (a) a zwitterionic compound comprising (i) sulfonate-functional groups and (ii) alkoxysilane groups and/or silanol-functional groups;

(b) an acid-catalyzed hydrolysis product of an alkoxysilane and a weak acid, wherein the acid-catalyzed hydrolysis product of an alkoxysilane comprises at least one (i)$(RO)_{(4-a)}Si(OH)_a$ where R is a monovalent hydrocarbon group and a is an integer from 1 to 4; or (ii) an alkanol silicate acid oligomer;

(c) a water-miscible organic solvent;

(d) water, and optionally a surfactant.

2. The coating composition of claim 1, wherein the zwitterionic compound is of Formula (I) $(R^1O)_p$—$Si(Q^1)_q$-X—$N^+(Y^1Y^2)$—(Z)—$SO_3^-$ (I)

Wherein each $R^1$ is independently a hydrogen, methyl group, or ethyl group;

each $Q^1$ is independently selected from hydroxyl, alkyl groups containing from 1 to 4 carbon atoms and alkoxy groups containing from 1 to 4 carbon atoms;

p is 1, 2, or 3;

q is 0, 1, or 2;

p+q=3;

X is a divalent alkylene group comprising at least 2, and no more than 12 carbon atoms and optionally comprising at least one ether linkage, at least one carbamate linkage, and/or at least one urea linkage;

$Y^1$ and $Y^2$ are each independently a monovalent alkyl group; and

Z is a divalent alkylene group comprising at least 2 and no more than 12 carbon atoms and optionally comprising a pendent hydroxyl group.

3. The coating composition of claim 1, wherein the zwitterionic compound is of Formula (III)

$$(R^1O)_p\text{—}Si(Q^1)_q\text{-}CH_2CH_2CH_2\text{—}N^+(CH_3)_2\text{—}(CH_2)_m\text{—}SO_3^- \quad \text{(III)}$$

wherein:

each $R^1$ is independently a hydrogen, methyl group, or ethyl group;

each $Q^1$ is independently selected from hydroxyl, alkyl groups containing from 1 to 4 carbon atoms and alkoxy groups containing from 1 to 4 carbon atoms;

p and m are integers of 1 to 4;

q is 0 or 1; and p+q=3.

4. The coating composition of claim 1, wherein the zwitterionic compound is of Formula (II)

$$(R^1O)_p\text{—}Si(Q^1)_q\text{-}(X)_r\text{-(pyradinyl)-}(Z)\text{—}SO_3^- \quad \text{(II)}$$

Wherein each $R^1$ is independently a hydrogen, methyl group, or ethyl group;

each $Q^1$ is independently selected from hydroxyl, alkyl groups containing from 1 to 4 carbon atoms and alkoxy groups containing from 1 to 4 carbon atoms;

p is 1, 2, or 3;

q is 0, 1, or 2;

p+q=3;

r is 0 or 1;

X is a divalent alkylene group comprising at least 2, and no more than 12 carbon atoms and optionally comprising at least one ether linkage, at least one carbamate linkage, and/or at least one urea linkage;

pyridinyl is a divalent pyridine group; and

Z is a divalent alkylene group comprising at least 2 and no more than 12 carbon atoms and optionally comprising a pendent hydroxyl group.

5. The coating composition of claim 1, wherein the zwitterionic compound is selected from at least one of:

$$(CH_3O)_3Si\text{—}CH_2CH_2CH_2\text{—}N^+(CH_3)_2\text{—}CH_2CH_2CH_2\text{—}SO_3^-$$

$$(CH_3CH_2O)_2Si(CH_3)\text{—}CH_2CH_2\text{—}N^+(CH_3)_2\text{—}CH_2CH_2CH_2\text{—}SO_3^-$$

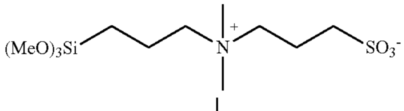

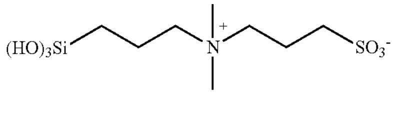

-continued

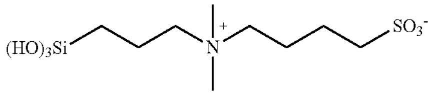

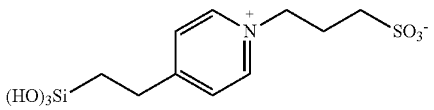

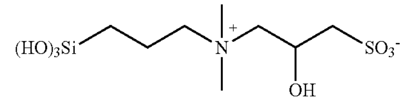

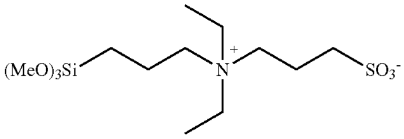

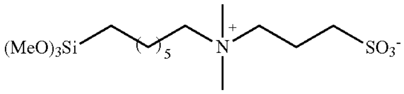

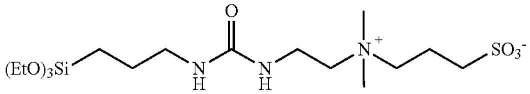 and

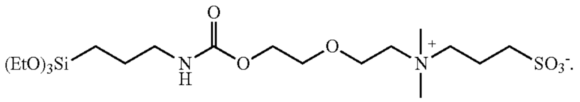

6. The coating composition of claim 1, wherein the acid-catalyzed hydrolysis product of an alkoxysilane comprises $(RO)_{(4-a)}Si(OH)_a$ and R is a monovalent hydrocarbon group comprising 1 or 2 carbon atoms and a is an integer from 1 to 4.

7. The coating composition of claim 1, wherein the acid-catalyzed hydrolysis product of an alkoxysilane comprises the alkanol silicate acid oligomer and wherein the alkanol silicate acid oligomer comprises a C1 to C2 alkanol.

8. The coating composition of claim 1, wherein the acid-catalyzed hydrolysis product of an alkoxysilane comprises the alkanol silicate acid oligomer and wherein the alkanolsilicate acid oligomer has a molecular weight of less than 1,000 daltons.

9. The coating composition of claim 1, wherein the surfactant is selected from an alkyl sulfate, alkyl ether sulfate, alkyl ethoxylate, and combinations thereof.

10. An article comprising a substrate with a coating layer thereon, wherein the coating layer is preparable by combining the components consisting of: (a) a zwitterionic compound comprising (i) sulfonate-functional groups and (ii) alkoxysilane groups and/or silanol-functional groups; (b) an acid-catalyzed hydrolysis product of an alkoxysilane, wherein the acid-catalyzed hydrolysis product of an alkoxysilane is derived from an alkoxysilane and a weak acid and wherein the acid-catalyzed hydrolysis product of an alkoxysilane comprises at least one (i) $(RO)_{(4-a)}Si(OH)_a$ where R is a monovalent hydrocarbon group and a is an integer from 1 to 4; or (ii) an alkanol silicate acid oligomer; (c) a water-miscible organic solvent; and (d) water.

11. The article of claim 10, wherein the substrate is at least one of a corona-treated polyethylene terephtalate and nano-silica coated polyethylene terephtalate.

12. A method comprising:

contacting a coating composition consisting of (a) an acid-catalyzed hydrolysis product of an alkoxysilane with (b) a zwitterionic compound, wherein the zwitterionic compound comprises (i) sulfonate-functional groups and (ii) alkoxysilane groups and/or silanol-functional groups; (c) a water-miscible organic solvent; and (d) water to form a coating composition, wherein the acid-catalyzed hydrolysis product of an alkoxysilane is derived from an alkoxysilane and a weak acid.

13. The coating composition of claim 1, wherein the coating composition consists of at least 0.1 wt % of the zwitterionic compound.

14. The coating composition of claim 1, wherein the weak acid has a pKa of at least 3.0 as measured in water in ambient conditions.

15. The article of claim 10, wherein the coating layer has a thickness of at least 2 micrometers.

* * * * *